US007981943B2

(12) United States Patent
Ito et al.

(10) Patent No.: US 7,981,943 B2
(45) Date of Patent: Jul. 19, 2011

(54) MATERIAL COMPRISING POLYROTAXANE AND POLYMER AND PROCESS FOR PRODUCING THE SAME

(75) Inventors: Kohzo Ito, Tokyo (JP); Masatoshi Kidowaki, Tokyo (JP)

(73) Assignee: The University of Tokyo, Tokyo (JP)

( * ) Notice: Subject to any disclaimer, the term of this patent is extended or adjusted under 35 U.S.C. 154(b) by 459 days.

(21) Appl. No.: 11/816,613

(22) PCT Filed: Feb. 21, 2006

(86) PCT No.: PCT/JP2006/303053
§ 371 (c)(1),
(2), (4) Date: Dec. 12, 2008

(87) PCT Pub. No.: WO2006/088200
PCT Pub. Date: Aug. 24, 2006

(65) Prior Publication Data
US 2009/0215919 A1  Aug. 27, 2009

(30) Foreign Application Priority Data
Feb. 21, 2005  (JP) .................................. 2005-043695

(51) Int. Cl.
*C08G 61/12* (2006.01)
*C08B 37/16* (2006.01)
*C08L 71/02* (2006.01)
(52) U.S. Cl. .......... 522/88; 522/111; 525/54.2; 527/300
(58) Field of Classification Search .................... 522/88, 522/162, 111; 527/300; 525/54.2
See application file for complete search history.

(56) References Cited

U.S. PATENT DOCUMENTS

| 5,531,871 | A | * | 7/1996 | Fauteux et al. | 205/688 |
| 6,828,378 | B2 | * | 12/2004 | Okumura et al. | 525/55 |
| 7,612,142 | B2 | * | 11/2009 | Ito et al. | 525/54.4 |
| 7,622,527 | B2 | * | 11/2009 | Ito et al. | 525/54.4 |
| 7,893,168 | B2 | * | 2/2011 | Ito et al. | 525/418 |
| 2003/0124168 | A1 | | 7/2003 | Yui | |
| 2003/0138398 | A1 | | 7/2003 | Okumura | |
| 2003/0171573 | A1 | | 9/2003 | Yui | |
| 2007/0205395 | A1 | * | 9/2007 | Nakajima et al. | 252/299.01 |
| 2009/0042034 | A1 | * | 2/2009 | Ito et al. | 428/413 |
| 2009/0047532 | A1 | * | 2/2009 | Ito et al. | 428/532 |
| 2009/0062467 | A1 | * | 3/2009 | Arai et al. | 525/54.2 |
| 2009/0088546 | A1 | * | 4/2009 | Ito et al. | 527/300 |
| 2009/0131588 | A1 | * | 5/2009 | Ito et al. | 525/54.2 |
| 2009/0312490 | A1 | * | 12/2009 | Ito et al. | 525/54.2 |
| 2009/0312491 | A1 | * | 12/2009 | Ito et al. | 525/54.26 |

FOREIGN PATENT DOCUMENTS

EP  1707587 A1  10/2006
JP  2004-083726 A  3/2004
(Continued)

*Primary Examiner* — Susan W Berman
(74) *Attorney, Agent, or Firm* — Christensen O'Connor Johnson Kindness PLLC

(57) ABSTRACT

A material which comprises a polyrotaxane and a polymer and is crosslinked by irradiation with light. In the material, which comprises a first polyrotaxane and a polymer, the first polyrotaxane comprises a first cyclic molecules, a first linear molecule with which the first cyclic molecules are clathrated in a splitted state, and first blocking groups disposed respectively at both ends of the first linear molecule so as to prevent the first cyclic molecules from being released from the first linear molecule. The first polyrotaxane combines with at least part of the polymer through the first cyclic molecules by photocrosslinking reaction.

11 Claims, 1 Drawing Sheet

FOREIGN PATENT DOCUMENTS

| | | |
|---|---|---|
| JP | 2005-320392 A | 11/2005 |
| JP | 2005-344097 A | 12/2005 |
| JP | 2006-028103 A | 2/2006 |
| WO | 03/074099 A1 | 9/2003 |

* cited by examiner

MATERIAL COMPRISING POLYROTAXANE AND POLYMER AND PROCESS FOR PRODUCING THE SAME

TECHNICAL FIELD

The present invention relates to a material comprising a polyrotaxane and a polymer, and a method for producing the material. In particular, the present invention relates to a material in which a part or all of polymers and the polyrotaxane are crosslinked with each other through photo-crosslinking reaction, and a method for producing the material.

BACKGROUND ART

A part of the present inventors have proposed a crosslinked polyrotaxane (See Patent Document 1, whole of which is incorporated herein by reference). The crosslinked polyrotaxane is formed by crosslinking polyrotaxanes, each of which is comprised of a pseudopolyrotaxane, which comprises a linear molecule (axis) and cyclic molecules (rota) in which the linear molecule is included in a cavity (cavities) of cyclic molecules in a skewered manner, and capping groups, each of which is located at each end of the pseudopolyrotaxane (each end of the linear molecule) in order to prevent the dissociation of the cyclic molecules. The crosslinked polyrotaxane has viscoelasticity generated by the movement of a cyclic molecule. Thus, even if strain is applied to the crosslinked polyrotaxane, the strain is dispersed uniformly in the crosslinked polyrotaxane by this action. Therefore, crack or scratch is not generated, in contrast to the conventional crosslinked polymer, and thus, the crosslinked polyrotaxane is expected to be applied in various fields.

PATENT DOCUMENT 1: JAPANESE PATENT NO. 3475252.

DISCLOSURE OF THE INVENTION

Problem to be Solved by the Invention

The crosslinking described in examples of Patent Document 1 is carried out by addition of a crosslinking agent. Thus, in the crosslinking, it is necessary to carry out treatment such as acidifying or basifying or heating the system to allow the reaction to proceed. However, if crosslinking is carried out without such treatment, the handling becomes easy. In addition, although polyrotaxanes are crosslinked with each other in crosslinked polyrotaxane, development of compounds produced by crosslinking polyrotaxane with other polymers is highly promoted, and crosslinkage is also requested to be carried out without the above treatment in some cases of the other polymers.

Additionally, the above crosslinking possesses the problem of making the handling of the crosslinked substance difficult as the crosslinkage proceeds.

An object of the present invention is to solve the problems described above.

Specifically, an object of the present invention is to provide a material comprising a polyrotaxane and a polymer in which the polyrotaxane and the polymer are crosslinked with each other by irradiation of light, and a method for producing the material.

Means for Solving Problem

The present inventors have found the following inventions:

<1> A material comprising a first polyrotaxane and a polymer, wherein the first polyrotaxane comprises a first cyclic molecule(s), a first linear molecule which is included in a cavity (cavities) of the first cyclic molecule(s) in a skewered manner, and a first capping group which is located at each end of the first linear molecule to prevent the dissociation of the first cyclic molecule(s), and wherein a part of the polyrotaxane and the polymer is bound to each other by a photo-crosslinking reaction through the first cyclic molecule(s).

<2> A material comprising a first polyrotaxane and a polymer, wherein the first polyrotaxane comprises a first cyclic molecule(s), a first linear molecule which is included in a cavity (cavities) of the first cyclic molecule(s) in a skewered manner, and a first capping group which is located at each end of the first linear molecule to prevent the dissociation of the first cyclic molecule(s), and wherein a part of the polyrotaxane and the polymer is bound to each other by a photo-crosslinking reaction through the first cyclic molecule(s), and wherein the material has a binding group generated by the photo-crosslinking reaction.

<3> In the above item <1> or <2>, the first polyrotaxane and the polymer each may have a photo-reactive group, and the polyrotaxane and the polymer may be bound to each other by the photo-crosslinking reaction between the photo-reactive groups.

<4> In the above item <3>, the photo-reactive group(s) in the first cyclic molecule(s) and/or the polymer may be a group having an unsaturated bond, preferably a group having an unsaturated double bond.

<5> In the above item <3> or <4>, the photo-reactive group(s) in the first cyclic molecule(s) and/or the polymer may be a photosensitive group.

<6> In the above item <5>, the photosensitive group may be at least one selected from the group consisting of cinnamoyl groups, cinnamylidene groups, chalcone residues, isocoumarin residues, 2,5-dimethoxystilbene residues, thymine residues, styrylpyridinium residues, α-phenylmaleimide residues, anthracene residues, and 2-pyron residues.

<7> In any one of the above items <1> to <6>, a reaction initiator may be used in the photo-crosslinking reaction.

<8> In the above item <7>, the reaction initiator may be at least one selected from the group consisting of quinones, aromatic ketones, benzoin, benzoin ethers, biimidazole compounds and derivatives thereof, N-phenylglycines, combinations of thioxanthones and alkylaminobenzoic acid, combinations of biimidazole compounds and derivatives thereof and Michler's ketones, acridines, and oxime esters. Specifically, the reaction initiator may be quinones such as 2-ethylanthraquinone, octaethylanthraquinone, 1,2-benzanthraquinone, 2,3-benzanthraquinone, 2-phenylanthraquinone, 2,3-diphenylanthraquinone, 1-chloroanthraquinone, 1,4-naphthoquinone, 9,10-phenanthraquinone, 2-methyl-1,4-naphthoquinone, 2,3-dimethylanthraquinone, 3-chloro-2-methylanthraquinone and the like; aromatic ketones such as benzophenone, Michler's ketone[4,4'-bis(dimethylamino)benzophenone], 4,4'-bis(diethylamino)benzophenone and the like; benzoin ethers such as benzoin, benzoinethyl ether, benzoinphenyl ether, methylbenzoin, ethylbenzoin and the like; biimidazole compounds and derivatives thereof such as benzyldimethyl ketal, benzyldiethyl ketal, triarylimidazolyl dimers and the like; N-phenylglycines such as N-phenylglycine, N-methyl-N-phenylglycine, N-ethyl-N-phenylglycine and the like; combinations of thioxanthones and alkylamine benzoic acid such as a combination of ethylthioxanthone and ethyl dimethylaminobenzoate, a combination of 2-chlorothioxanthone and ethyl dimethylaminobenzoate, a combination of isopropylthioxanthone and ethyl dimethylbenzoate, and the like; combinations of biimidazole compounds such as triarylimidazolyl dimers and derivatives thereof and Michler's ketone; acridines such as 9-phenylacridine and the like; and oxime esters such as 1-phenyl-1,2-propanedione-2-o-benzoineoxime 1-phenyl-1,2-propanedione-2-(o-ethoxycarbonyl)oxime and the like. Preferably, the reaction initiator may be thioxanthones such as diethylthioxanthone, chlorothioxanthone and the like; dialkylaminobenzoate esters such as ethyl dimethylaminobenzoate and the like; benzophenone, 4,4'-bis(dimethylamino)benzophenone, 4,4'-bis(diethylamino)benzophenone; biimidazole compounds such as triarylimidazolyl dimers and derivatives thereof; 9-phenylacridine, N-phenylglycines and combinations thereof. Furthermore, the biimidazole compounds such as triarylimidazolyl dimers and derivatives thereof may include, for example, 2-(o-chlorophenyl)-4,5-diphenylimidazolyl dimers, 2,2',5-tris-(o-chlorophenyl)-4-(3,4-dimethoxyphenyl)-4',5'-diphenylimidazolyl dimers, 2,4-bis-(o-chlorophenyl)-5-(3,4-dimethoxyphenyl)-diphenylimidazolyl dimers, 2,4,5-tris-(o-chlorophenyl)-diphenylimidazolyl dimers, 2-(o-chlorophenyl)-bis-4,5-(3,4-dimethoxyphenyl)-imidazolyl dimers, 2,2'-bis-(2-fluorophenyl)-4,4',5,5'-tetrakis-(3-methoxyphenyl)-imidazolyl dimers, 2,2'-bis-(2,3-difluoromethylphenyl)-4,4',5,5'-tetrakis-(3-methoxyphenyl)-imidazolyl dimers, 2,2'-bis-(2,4-difluorophenyl)-4,4',5,5'-tetrakis-(3-methoxyphenyl)-imidazolyl dimers, 2,2'-bis-(2,5-difluorophenyl)-4,4',5,5'-tetrakis-(3-methoxyphenyl)-imidazolyl dimers, 2,2'-bis-(2,6-difluorophenyl)-4,4',5,5'-tetrakis-(3-methoxyphenyl)-imidazolyl dimers, 2,2'-bis-(2,3,4-trifluorophenyl)-4,4',5,5'-tetrakis-(3-methoxyphenyl)-imidazolyl dimers, 2,2'-bis-(2,3,5-trifluorophenyl)-4,4',5,5'-tetrakis-(3-methoxyphenyl)-imidazolyl dimers, 2,2'-bis-(2,3,6-trifluorophenyl)-4,4',5,5'-tetrakis-(3-methoxyphenyl)-imidazolyl dimers, 2,2'-bis-(2,4,5-trifluorophenyl)-4,4',5,5'-tetrakis-(3-methoxyphenyl)-imidazolyl dimers, 2,2'-bis-(2,4,6-trifluorophenyl)-4,4',5,5'-tetrakis-(3-methoxyphenyl)-imidazolyl dimers, 2,2'-bis-(2,3,4,5-tetrafluorophenyl)-4,4',5,5'-tetrakis-(3-methoxyphenyl)-imidazolyl dimers, 2,2'-bis-(2,3,4,6-tetrafluorophenyl)-4,4',5,5'-tetrakis-(3-methoxyphenyl)-imidazolyl dimers, 2,2'-bis-(2,3,4,5,6-pentafluorophenyl)-4,4',5,5'-tetrakis-(3-methoxyphenyl)-imidazolyl dimers, and the like.

<9> In any one of the above items <1> to <8>, at least a part of the polymer may be physically and/or chemically crosslinked.

<10> In any one of the above items <1> to <9>, a backbone chain or side chain of the polymer may have at least one selected from the group consisting of a —OH group, a —NH$_2$ group, a —COOH group, an epoxy group, a vinyl group, a thiol group, and a photo-crosslinkable group, thereby the polymers may be physically and/or chemically crosslinked. Furthermore, examples of the photo-crosslinkable group may include, but are not limited to, cinnamic acid, coumarin, chalcone, anthracene, styrylpyridine, styrylpyridinium salt, styrylquinolium salt and the like.

<11> In any one of the above items <1> to <10>, a weight ratio of the first polyrotaxane to the polymer ((first polyrotaxane)/(polymer)) may be 1/1000 or more, preferably 1/100 or more, more preferably 1/10 or more.

<12> In any one of the above items <1> to <11>, the polymer may be a second polyrotaxane, and wherein the second polyrotaxane comprises a second cyclic molecule(s), a second linear molecule which is included in a cavity (cavities) of the second cyclic molecule(s) in a skewered manner, and a second capping group which is located at each end of the second linear molecule to prevent the dissociation of the second cyclic molecule(s), and wherein a part of the first polyrotaxane and the second polyrotaxane may be bound to each other through the first cyclic molecule(s) or through the first and second cyclic molecules.

<13> In the above item <12>, the first and second cyclic molecule(s) each may have a photo-reactive group, and the first polyrotaxane and the second polyrotaxane may be bound to each other by the photo-crosslinking reaction between the photo-reactive groups.

<14> In the above item <13>, the photo-reactive group(s) in the first cyclic molecule(s) and/or the second cyclic molecule(s) may be a group having an unsaturated bond, preferably a group having an unsaturated double bond.

<15> In the above item <13> or <14>, the photo-reactive group(s) in the first cyclic molecule(s) and/or the second cyclic molecule(s) may be a photosensitive group.

<16> In the above item <15>, the photosensitive group may be at least one selected from the group consisting of cinnamoyl groups, cinnamylidene groups, chalcone residues, isocoumarin residues, 2,5-dimethoxystilbene residues, thymine residues, styrylpyridinium residues, α-phenylmaleimide residues, anthracene residues, and 2-pyron residues.

<17> In any one of the above items <13> to <16>, a reaction initiator may be used in the photo-crosslinking reaction.

<18> In the above item <17>, the reaction initiator may be at least one selected from the group consisting of quinones, aromatic ketones, benzoin, benzoin ethers, biimidazole compounds and derivatives thereof, N-phenylglycines, combinations of thioxanthones and alkylaminobenzoic acid, combinations of biimidazole compounds and derivatives thereof and Michler's ketones, acridines, and oxime esters. Furthermore, specific examples of the reaction initiator may include ones described in the above item <8>.

<19> In any one of the above items <1> to <18>, the first and/or second linear molecule may be selected from the group consisting of polyvinyl alcohol, polyvinylpyrrolidone, poly(meth)acrylic acid, cellulose-based resins (carboxymethylcellulose, hydroxyethylcellulose, hydroxypropylcellulose and the like), polyacrylamide, polyethylene oxide, polyethylene glycol, polypropylene glycol, polyvinyl acetalbased resins, polyvinyl methyl ether, polyamine, polyethyleneimine, casein, gelatin, starch and the like and/or copolymers thereof, polyolefin-based resins such as polyethylene, polypropylene, and copolymer resins with other olefinic monomers, polyester resins, polyvinyl chloride resins, polystyrene-based resins such as polystyrene, acrylonitrile-styrene copolymer resin and the like, acrylic resins such as polymethyl methacrylate, copolymer of (meth)acrylate, acrylonitrile-methyl acrylate copolymer resin and the like, polycarbonate resins, polyurethane resins, vinyl chloride-vinyl acetate copolymer resin, polyvinylbutyral resin and the like; and derivatives and modifications thereof, polyisobutylene, polytetrahydrofuran, polyaniline, acrylonitrile-butadiene-styrene copolymer (ABS resin), polyamides such as nylon and the like, polyimides, polydienes such as polyisoprene, polybutadiene and the like, polysiloxanes such as polydimethylsiloxane and the like, polysulfones, polyimines, polyacetic anhydrides, polyureas, polysulfides, polyphosphazenes, polyketones, polyphenylenes, polyhaloolefins, and derivatives thereof. For example, the linear molecule may be selected from the group consisting of polypropylene glycol, polyisoprene, polyisobutylene, polybutadiene, polypropylene glycol, polytetrahydrofuran, polydimethylsiloxane, polyethylene and polypropylene. Preferably, the linear molecule may be selected from the group consisting of polyethylene glycol, polypropylene glycol, polytetrahydrofuran, polyethylene glycol, polydimethylsiloxane, polyethylene and polypropylene, and more preferably polyethylene glycol.

<20> In any one of the above items <1> to <19>, the first and/or second linear molecule has a molecular weight of 10,000 or more, preferably 20,000 or more, more preferably 35,000 or more.

<21> In any one of the above items <1> to <20>, the first and/or second capping group may be selected from the group consisting of dinitrophenyl groups; cyclodextrins; adamantane groups; trityl groups; fluoresceins; pyrenes; substituted benzenes (examples of the substituent may include, but are not limited to, alkyl, alkyloxy, hydroxy, halogen, cyano, sulfonyl, carboxyl, amino, phenyl and the like. The substituent may be single or plural.); polycyclic aromatics which may be substituted (examples of the substituent may include, but are not limited to, those described above. The substituent may be single or plural.); and steroids. Preferably, the capping group may be selected from the group consisting of dinitrophenyl groups; cyclodextrins; adamantane groups; trityl groups; fluoresceins; and pyrenes, more preferably adamantane groups; or trityl groups.

<22> In any one of the above items <1> to <21>, the first and/or second cyclic molecule may be a cyclodextrin molecule which may be substituted.

<23> In any one of the above items <1> to <22>, the first and/or second cyclic molecule may be a cyclodextrin molecule which may be substituted, and the cyclodextrin molecule may be selected from the group consisting of α-cyclodextrin, β-cyclodextrin and γ-cyclodextrin, and derivatives thereof.

<24> In any one of the above items <1> to <23>, the first and/or second cyclic molecule may be α-cyclodextrin which may be substituted, and the first and/or second linear molecule may be polyethylene glycol.

<25> In any one of the above items <1> to <24>, the first and/or second linear molecule may have the first and/or second cyclic molecule(s) included in a skewered manner at an amount of 0.001 to 0.6, preferably 0.01 to 0.5, more preferably 0.05 to 0.4 of a maximum inclusion amount, which is defined as an amount at which the first and/or second cyclic molecules can be included at maximum when the first and/or second linear molecule has the first and/or second cyclic molecules included in a skewered manner, and the amount at maximum is normalized to be 1.

<26> In any one of the above items <1> to <25>, the material may be used as a flexible material.

<27> A method for preparing a material which comprises a first polyrotaxane and a polymer comprising the steps of:

a) preparing the first polyrotaxane which comprises a first cyclic molecule(s), a first linear molecule which is included in a cavity (cavities) of the first cyclic molecule(s) in a skewered manner, and a first capping group which is located at each end of the first linear molecule to prevent the dissociation of the first cyclic molecule(s), and the first cyclic molecule(s) has (have) a first photo-reactive group;

b) preparing the polymer comprising a second photo-reactive group which may be the same as or different from the first photo-reactive group;

c) mixing the first polyrotaxane and the polymer to obtain the mixture; and d) irradiating the mixture and binding at least a part of the first polyrotaxane and the polymer to each other by a photo-crosslinking reaction through the first cyclic molecule(s), to obtain the material.

<28> In the above item <27>, the first and/or second photo-reactive group(s) may be a group having an unsaturated bond.

<29> In the above item <27> or <28>, the first and/or second photo-reactive group(s) may be a photosensitive group.

<30> In the above item <29>, the photosensitive group may be at least one selected from the group consisting of cinnamoyl groups, cinnamylidene groups, chalcone residues, isocoumarin residues, 2,5-dimethoxystilbene residues, thymine residues, styrylpyridinium residues, α-phenylmaleimide residues, anthracene residues, and 2-pyron residues.

<31> In any one of the above items <27> to <30>, during the step c), or after the step c) and prior to the step d), the method further may comprise a step of adding a reaction initiator into the mixture.

<32> In the above item <31>, a reaction initiator may be at least one selected from the group consisting of quinones, aromatic ketones, benzoin, benzoin ethers, biimidazole compounds and derivatives thereof, N-phenylglycines, combinations of thioxanthones and alkylaminobenzoic acid, combinations of biimidazole compounds and derivatives thereof and Michler's ketones, acridines, and oxime esters. Furthermore, specific examples of the reaction initiator may include ones described in the above item <8>.

<33> In any one of the above items <27> to <32>, a part of the first and second photo-reactive group(s) may be a group having an unsaturated bond, a part of the first and second photo-reactive group(s) may be a photosensitive group, and wherein in the step d), i) reacting the groups each having the unsaturated bond with each other, thereafter reacting the photosensitive groups with each other, to obtain the material, ii) reacting the photosensitive groups with each other, thereafter reacting the groups each having the unsaturated bond with each other, to obtain the material, or iii) substantially effecting the reactions between the photosensitive groups and reactions between the groups each having the unsaturated bond, to obtain the material.

<34> In any one of the above items <27> to <33>, at least a part of the polymer may be physically and/or chemically crosslinked.

<35> In any one of the above items <27> to <34>, a backbone chain or side chain of the polymer may have at least one selected from the group consisting of a —OH group, a —$NH_2$ group, a —COOH group, an epoxy group, a vinyl group, a thiol group, and a photo-crosslinkable group, thereby the polymers may be physically and/or chemically crosslinked. Furthermore, examples of the photo-crosslinkable group may include, but are not limited to, cinnamic acid, coumarin, chalcone, anthracene, styrylpyridine, styrylpyridinium salt, styrylquinolium salt and the like.

<36> In any one of the above items <27> to <35>, a weight ratio of the first polyrotaxane to the polymer ((first polyrotaxane)/(polymer)) may be 1/1000 or more, preferably 1/100 or more, more preferably 1/10 or more.

<37> In any one of the above items <27> to <36>, the polymer may be a second polyrotaxane, and wherein the second polyrotaxane comprises a second cyclic molecule(s), a second linear molecule which is included in a cavity (cavities) of the second cyclic molecule(s) in a skewered manner, and a second capping group which is located at each end of the second linear molecule to prevent the dissociation of the second cyclic molecule(s), and wherein a part of the first polyrotaxane and the second polyrotaxane may be bound to each other through the first cyclic molecule(s) or through the first or second cyclic molecule(s).

<38> In the above item <37>, the first and second cyclic molecule(s) each may have a photo-reactive group, and the first polyrotaxane and the second polyrotaxane may be bound to each other by the photo-crosslinking reaction between the photo-reactive groups.

<39> In the above item <38>, the photo-reactive group(s) in the first cyclic molecule(s) and/or the second cyclic molecule(s) may be a group having an unsaturated bond, preferably a group having an unsaturated double bond.

<40> In the above item <38> or <39>, the photo-reactive group(s) in the first cyclic molecule(s) and/or the second cyclic molecule(s) may be a photosensitive group.

<41> In the above item <40>, the photosensitive group may be at least one selected from the group consisting of cinnamoyl groups, cinnamylidene groups, chalcone residues, isocoumarin residues, 2,5-dimethoxystilbene residues, thymine residues, styrylpyridinium residues, α-phenylmaleimide residues, anthracene residues, and 2-pyron residues.

<42> In any one of the above items <38> to <41>, a reaction initiator may be used in the photo-crosslinking reaction.

<43> In the above item <42>, the reaction initiator may be at least one selected from the group consisting of quinones, aromatic ketones, benzoin, benzoin ethers, biimidazole compounds and derivatives thereof, N-phenylglycines, combinations of thioxanthones and alkylaminobenzoic acid, combinations of biimidazole compounds and derivatives thereof and Michler's ketones, acridines, and oxime esters. Furthermore, specific examples of the reaction initiator may include ones described in the above item <8>.

<44> In any one of the above items <27> to <43>, the first and/or second linear molecule may be selected from the group consisting of polyvinyl alcohol, polyvinylpyrrolidone, poly(meth)acrylic acid, cellulose-based resins (carboxymethylcellulose, hydroxyethylcellulose, hydroxypropylcellulose and the like), polyacrylamide, polyethylene oxide, polyethylene glycol, polypropylene glycol, polyvinyl acetal-based resins, polyvinyl methyl ether, polyamine, polyethyleneimine, casein, gelatin, starch and the like and/or copolymers thereof, polyolefin-based resins such as polyethylene, polypropylene, and copolymer resins with other olefinic monomers, polyester resins, polyvinyl chloride resins, polystyrene-based resins such as polystyrene, acrylonitrile-styrene copolymer resin and the like, acrylic resins such as polymethyl methacrylate, copolymer of (meth)acrylate, acrylonitrile-methyl acrylate copolymer resin and the like, polycarbonate resins, polyurethane resins, vinyl chloride-vinyl acetate copolymer resin, polyvinylbutyral resin and the like; and derivatives and modifications thereof, polyisobutylene, polytetrahydrofuran, polyaniline, acrylonitrile-butadiene-styrene copolymer (ABS resin), polyamides such as nylon and the like, polyimides, polydienes such as polyisoprene, polybutadiene and the like, polysiloxanes such as polydimethylsiloxane and the like, polysulfones, polyimines, polyacetic anhydrides, polyureas, polysulfides, polyphosphazenes, polyketones, polyphenylenes, polyhaloolefins, and derivatives thereof. For example, the linear molecule may be selected from the group consisting of polypropylene glycol, polyisoprene, polyisobutylene, polybutadiene, polypropylene glycol, polytetrahydrofuran, polydimethylsiloxane, polyethylene and polypropylene. Preferably, the linear molecule may be selected from the group consisting of polyethylene glycol, polypropylene glycol, polytetrahydrofuran, polydimethylsiloxane, polyethylene and polypropylene, and more preferably polyethylene glycol.

<45> In any one of the above items <27> to <44>, the first and/or second linear molecule has a molecular weight of 10,000 or more, preferably 20,000 or more, more preferably 35,000 or more.

<46> In any one of the above items <27> to <45>, the first and/or second capping group may be selected from the group consisting of dinitrophenyl groups; cyclodextrins; adamantane groups; trityl groups; fluoresceins; pyrenes; substituted benzenes (examples of the substituent may include, but are not limited to, alkyl, alkyloxy, hydroxy, halogen, cyano, sulfonyl, carboxyl, amino, phenyl and the like. The substituent may be single or plural.); polycyclic aromatics which may be substituted (examples of the substituent may include, but are not limited to, those described above. The substituent may be single or plural.); and steroids. Preferably, the capping group may be selected from the group consisting of dinitrophenyl groups; cyclodextrins; adamantane groups; trityl groups; fluoresceins; and pyrenes, more preferably adamantane groups; or trityl groups.

<47> In any one of the above items <27> to <46>, the first and/or second cyclic molecule may be a cyclodextrin molecule which may be substituted.

<48> In any one of the above items <27> to <47>, the first and/or second cyclic molecule may be a cyclodextrin molecule which may be substituted, and the cyclodextrin molecule may be selected from the group consisting of α-cyclodextrin, β-cyclodextrin and γ-cyclodextrin, and derivatives thereof.

<49> In any one of the above items <27> to <48>, the first and/or second cyclic molecule may be α-cyclodextrin which may be substituted, and the first and/or second linear molecule may be polyethylene glycol.

<50> In any one of the above items <27> to <49>, the first and/or second linear molecule may have the first and/or second cyclic molecule(s) included in a skewered manner at an amount of 0.001 to 0.6, preferably 0.01 to 0.5, more preferably 0.05 to 0.4 of a maximum inclusion amount, which is defined as an amount at which the first and/or second cyclic molecules can be included at maximum when the first and/or second linear molecule has the first and/or second cyclic molecules included in a skewered manner, and the amount at maximum is normalized to be 1.

<51> In any one of the above items <27> to <50>, the material may be used as a flexible material.

Effects of the Invention

The present invention can provide a material comprising a polyrotaxane and a polymer in which the polyrotaxane and the polymer are crosslinked with each other by irradiation, and a method for producing the material.

PREFERRED EMBODIMENTS FOR CARRYING OUT THE PRESENT INVENTION

The present invention will be described in detail hereinafter.

The present invention provides a material comprising a first polyrotaxane and a polymer, wherein the first polyrotaxane comprises a first cyclic molecule(s), a first linear molecule which is included in a cavity (cavities) of the first cyclic molecule(s) in a skewered manner, and a first capping group which is located at each end of the first linear molecule to prevent the dissociation of the first cyclic molecule(s), and wherein a part of the polyrotaxane and the polymer is bound to each other by a photo-crosslinking reaction through the first cyclic molecule(s). In other words, the material according to the present invention comprises the first polyrotaxane and the polymer, and a part of the polyrotaxane and the polymer is bound to each other by a photo-crosslinking reaction through the first cyclic molecule(s), and the material has a binding group generated by the photo-crosslinking reaction.

Furthermore, the polymer may be a second polyrotaxane which may be same as or different from the first polyrotaxane.

The material according to the present invention will be illustrated using FIG. 1. FIG. 1 shows a schematic view of a material 1 of the present invention, which comprises a polymer 3 and a first polyrotaxane 5. The first polyrotaxane 5 has a first linear molecule 6, a first cyclic molecule 7 and a first capping group 8. The polymer 3 and polymer 3' and the polyrotaxane 5 are bound through the cyclic molecule 7. When stress of deformation along an arrow direction is loaded on the material 1 as shown in FIG. 1(a), the material 1 can adopt a configuration as shown in FIG. 1(b). That is, since the first cyclic molecule 7 can move along the first linear molecule 6 (in other words, the linear molecule can move in the cyclic molecule), stress of deformation can be absorbed within the material.

The present invention can carry out linkage between the polymer 3 and the first polyrotaxane 5 by photo-crosslinking reaction.

Use of photo-reactive groups between a cyclic molecule of the first polyrotaxane and the polymer can carry out photo-crosslinking reaction, as described later. Use of photo-crosslinking reaction allows reaction conditions, e.g., acidity or basicity or temperatures, to be mild, different from the reaction using a conventional crosslinking agent. Therefore, the cross-linking reaction according to the present invention can be carried out without adversely affecting the polymer or the first polyrotaxane to be used. Further, conventional crosslinking reactions are restricted to the case where a polyrotaxane is soluble in the employed solvent. The use of the photo-crosslinking reaction of the present invention removes the restriction and can improve the selectivity of solvents in the reaction, including cross-linking reactions without using solvents. More, although the difficulty in handling of the cross-linked substances is observed in the conventional crosslinking reaction, the photo-crosslinking reaction according to the present invention can provide the advantage of making the handling of the crosslinked substances easier.

The photo-crosslinking reaction according to the present invention can be carried out by using photo-reactive groups of a cyclic molecule of the first polyrotaxane and the polymer. The photo-reactive groups may include groups each having an unsaturated bond (e.g., groups each having an unsaturated double bond) or photosensitive groups.

In a case where the photo-reactive group is a group having an unsaturated bond, the photo-crosslinking reaction is initiated by means of photo-irradiation and a reaction initiator to generate bindings between the groups each having the unsaturated bond. In this case, a reaction initiator may be present in the reaction field. Alternatively, in a case where the photo-reactive group is a photosensitive group, the photo-crosslinking reaction is initiated by photo-irradiation to generate bindings between photosensitive groups without using a reaction initiator.

The groups each having an unsaturated bond, e.g., groups each having an unsaturated double bond, may include, but are not limited to, olefinic groups, for example, acrylic groups, methacrylic groups, vinyl ether groups, styryl groups, and the like.

The reaction initiator may be at least one selected from the group consisting of quinones, aromatic ketones, benzoin, benzoin ethers, biimidazole compounds and derivatives thereof, N-phenylglycines, combinations of thioxanthones and alkylaminobenzoic acid, combinations of biimidazole compounds and derivatives thereof and Michler's ketones, acridines, and oxime esters. Specifically, the reaction initiator may be quinones such as 2-ethylanthraquinone, octaethylanthraquinone, 1,2-benzanthraquinone, 2,3-benzanthraquinone, 2-phenylanthraquinone, 2,3-diphenylanthraquinone, 1-chloroanthraquinone, 1,4-naphthoquinone, 9,10-phenanthraquinone, 2-methyl-1,4-naphthoquinone, 2,3-dimethylanthraquinone, 3-chloro-2-methylanthraquinone and the like; aromatic ketones such as benzophenone, Michler's ketone[4,4'-bis(dimethylamino)benzophenone], 4,4'-bis(diethylamino)benzophenone and the like; benzoin ethers such as benzoin, benzoinethyl ether, benzoinphenyl ether, methylbenzoin, ethylbenzoin and the like; biimidazole compounds and derivatives thereof such as benzyldimethyl ketal, benzyldiethyl ketal, triarylimidazolyl dimers and the like; N-phenylglycines such as N-phenylglycine, N-methyl-N-phenylglycine, N-ethyl-N-phenylglycine and the like; combinations of thioxanthones and alkylamine benzoic acid such as a combination of ethylthioxanthone and ethyl dimethylaminobenzoate, a combination of 2-chlorothioxanthone and ethyl dimethylaminobenzoate, a combination of isopropylthioxanthone and ethyl dimethylbenzoate, and the like; combinations of biimidazole compounds such as triarylimidazolyl dimers and derivatives thereof and Michler's ketone; acridines such as 9-phenylacridine and the like; and oxime esters such as 1-phenyl-1,2-propanedione-2-o-benzoineoxime, 1-phenyl-1,2-propanedione-2-(o-ethoxycarbonyl)oxime and the like. Preferably, the reaction initiator may be thioxanthones such as diethylthioxanthone, chlorothioxanthone and the like; dialkylaminobenzoate esters such as ethyl dimethylaminobenzoate and the like; benzophenone, 4,4'-bis(dimethylamino)benzophenone, 4,4'-bis(diethylamino)benzophenone; biimidazole compounds such as triarylimidazolyl dimers and derivatives thereof; 9-phenylacridine, N-phenylglycines; and combinations thereof. Furthermore, the biimidazole compounds such as triarylimidazolyl dimers and derivatives thereof may include, for example, 2-(o-chlorophenyl)-4,5-diphenylimidazolyl dimers, 2,2',5-tris-(o-chlorophenyl)-4-(3,4-dimethoxyphenyl)-4',5'-diphenylimidazolyl dimers, 2,4-bis-(o-chlorophenyl)-5-(3,4-dimethoxyphenyl)-diphenylimidazolyl dimers, 2,4,5-tris-(o-chlorophenyl)-diphenylimidazolyl dimers, 2-(o-chlorophenyl)-bis-4,5-(3,4-dimethoxyphenyl)-imidazolyl dimers, 2,2'-bis-(2-fluorophenyl)-4,4',5,5'-tetrakis-(3-methoxyphenyl)-imidazolyl dimers, 2,2'-bis-(2,3-difluoromethylphenyl)-4,4',5,5'-tetrakis-(3-methoxyphenyl)-imidazolyl dimers, 2,2'-bis-(2,4-difluorophenyl)-4,4',5,5'-tetrakis-(3-methoxyphenyl)-imidazolyl dimers, 2,2'-bis-(2,5-difluorophenyl)-4,4',5,5'-tetrakis-(3-methoxyphenyl)-imidazolyl dimers, 2,2'-bis-(2,6-difluorophenyl)-4,4',5,5'-tetrakis-(3-methoxyphenyl)-imidazolyl dimers, 2,2'-bis-(2,3,4-trifluorophenyl)-4,4',5,5'-tetrakis-(3-methoxyphenyl)-imidazolyl dimers, 2,2'-bis-(2,3,5-trifluorophenyl)-4,4',5,5'-tetrakis-(3-methoxyphenyl)-imidazolyl dimers, 2,2'-bis-(2,3,6-trifluorophenyl)-4,4',5,5'-tetrakis-(3-methoxyphenyl)-imidazolyl dimers, 2,2'-bis-(2,4,5-trifluorophenyl)-4,4',5,5'-tetrakis-(3-methoxyphenyl)-imidazolyl dimers, 2,2'-bis-(2,4,6-trifluorophenyl)-4,4',5,5'-tetrakis-(3-methoxyphenyl)-imidazolyl dimers, 2,2'-bis-(2,3,4,5-tetrafluorophenyl)-4,4',5,5'-tetrakis-(3-methoxyphenyl)-imidazolyl dimers, 2,2'-bis-(2,3,4,6-tetrafluorophenyl)-4,4',5,5'-tetrakis-(3-methoxyphenyl)-imidazolyl dimers, 2,2'-bis-(2,3,4,5,6-pentafluorophenyl)-4,4',5,5'-tetrakis-(3-methoxyphenyl)-imidazolyl dimers, and the like.

The photosensitive groups may include, but are not limited to, cinnamoyl groups, cinnamylidene groups, chalcone residues, isocoumarin residues, 2,5-dimethoxystilbene residues, thymine residues, styrylpyridinium residues, α-phenylmaleimide residues, anthracene residues, 2-pyron residues, and the like.

At least a part of the polymers in the material according to the present invention may be physically and/or chemically crosslinked. The crosslinking between the polymers can be carried out, prior to, at the same time of, or after the photocrosslinking reaction of the first polyrotaxane and the polymer.

The polymer in the material according to the present invention may have on a backbone chain or side chain, depending on the characteristics required for the material, but is not limited to, at least one selected from the group consisting of a —OH group, a —NH$_2$ group, a —COOH group, an epoxy group, a vinyl group, a thiol group and a photo-crosslinkable group, in order to physically and/or chemically crosslink the polymer(s). The photo-crosslinkable group may include, but are not limited to, cinnamic acid, coumarin, chalcone, anthracene, styrylpyridine, styrylpyridinium salt, styrylquinolium salt and the like.

The presence of the first polyrotaxane in the material according to the present invention can provide expansion and contraction of the material as described above. The amount of the polyrotaxane in the material depends on a nature required for the material. For example, the weight ratio of the polyrotaxane to the polymer ((first polyrotaxane)/(polymer)) may be 1/1000 or more, preferably 1/100 or more, more preferably 1/10 or more.

The polymer in the present invention may be a homopolymer or copolymer. Two or more polymers may be present. In a case where two or more polymers are present, at least one polymer may be bound to the first polyrotaxane through the first cyclic molecule. In a case where the polymer of a material according to the present invention is a copolymer, it may be composed of two, or three or more monomers. In the case of a copolymer, the copolymer may be one of a block copolymer, alternating copolymer, random copolymer, graft copolymer and the like.

Examples of the polymer may include, but are not limited to, polyvinyl alcohol, polyvinylpyrrolidone, poly(meth)acrylic acid, cellulose-based resins (carboxymethylcellulose, hydroxyethylcellulose, hydroxypropylcellulose and the like), polyacrylamide, polyethylene oxide, polyethylene glycol, polypropylene glycol, polyvinyl acetal-based resins, polyvinyl methyl ether, polyamine, polyethyleneimine, casein, gelatin, starch and the like and/or copolymers thereof, polyolefin-based resins such as polyethylene, polypropylene, and copolymer resins with other olefinic monomers, polyester resins, polyvinyl chloride resins, polystyrene-based resins such as polystyrene, acrylonitrile-styrene copolymer resin and the like, acrylic resins such as polymethyl methacrylate, copolymer of (meth)acrylate, acrylonitrile-methyl acrylate copolymer resin and the like, polycarbonate resins, polyurethane resins, vinyl chloride-vinyl acetate copolymer resin, polyvinylbutyral resin and the like; and derivatives and modifications thereof, polyisobutylene, polytetrahydrofuran, polyaniline, acrylonitrile-butadiene-styrene copolymer (ABS resin), polyamides such as nylon and the like, polyimides, polydienes such as polyisoprene, polybutadiene and the like, polysiloxanes such as polydimethylsiloxane and the like, polysulfones, polyimines, polyacetic anhydrides, polyureas, polysulfides, polyphosphazenes, polyketones, polyphenylenes, polyhaloolefins, and derivatives thereof. The derivatives may contain the above-described group, i.e., at least one selected from the group consisting of a —OH group, a —NH$_2$ group, a —COOH group, an epoxy group, a vinyl group, a thiol group and a photo-crosslinkable group.

The first linear molecule of the first polyrotaxane in the material according to the present invention may include polyvinyl alcohol, polyvinylpyrrolidone, poly(meth)acrylic acid, cellulose-based resins (carboxymethylcellulose, hydroxyethylcellulose, hydroxypropylcellulose and the like), polyacrylamide, polyethylene oxide, polyethylene glycol, polypropylene glycol, polyvinyl acetal-based resins, polyvinyl methyl ether, polyamine, polyethyleneimine, casein, gelatin, starch and the like and/or copolymers thereof, polyolefin-based resins such as polyethylene, polypropylene, and copolymer resins with other olefinic monomers, polyester resins, polyvinyl chloride resins, polystyrene-based resins such as polystyrene, acrylonitrile-styrene copolymer resin and the like, acrylic resins such as polymethyl methacrylate, copolymer of (meth)acrylate, acrylonitrile-methyl acrylate copolymer resin and the like, polycarbonate resins, polyurethane resins, vinyl chloride-vinyl acetate copolymer resin, polyvinylbutyral resin and the like; and derivatives and modifications thereof, polyisobutylene, polytetrahydrofuran, polyaniline, acrylonitrile-butadiene-styrene copolymer (ABS resin), polyamides such as nylon and the like, polyimides, polydienes such as polyisoprene, polybutadiene and the like, polysiloxanes such as polydimethylsiloxane and the like, polysulfones, polyimines, polyacetic anhydrides, polyureas, polysulfides, polyphosphazenes, polyketones, polyphenylenes, polyhaloolefins, and derivatives thereof. For example, the linear molecule may be selected from the group consisting of polypropylene glycol, polytetrahydrofuran, polydimethylsiloxane, polyethylene and polypropylene, and preferably polyethylene glycol.

A molecular weight of the first linear molecule according to the present invention may be 10,000 or more, preferably 20,000 or more, more preferably 35,000 or more.

The first capping group of the first polyrotaxane in the material according to the present invention is not limited, as long as the group has an action of preventing the dissociation of a first cyclic molecule from a first linear molecule. The first capping group may be selected from the group consisting of dinitrophenyl groups; cyclodextrins; adamantane groups; trityl groups; fluoresceins; pyrenes; substituted benzenes (example of the substituent may include, but are not limited to, alkyl, alkyloxy, hydroxy, halogen, cyano, sulfonyl, carboxyl, amino, phenyl and the like. The substituent may be single or plural.); polycyclic aromatics which may be substituted (examples of the substituent may include, but are not limited to, those described above. The substituent may be single or plural.); and steroids. Preferably, the capping group may be selected from the group consisting of dinitrophenyl groups; cyclodextrins; adamantane groups; trityl groups; fluoresceins; and pyrenes, more preferably adamantane groups; or trityl groups.

The first cyclic molecule in the material according to the present invention may be substituted with a variety of group(s). The substituted group can provide some properties, for example, a water-soluble property to the material. For example, the first cyclic molecule may be a cyclodextrin molecule which may be substituted. The cyclodextrin molecule may be selected from the group consisting of α-cyclodextrin, β-cyclodextrin and γ-cyclodextrin, and derivatives thereof.

Furthermore, in a case where the second polyrotaxane is used as the polymer, a) the first cyclic molecule of the first polyrotaxane and the second polyrotaxane may be physically or chemically bound at any site of the second polyrotaxane through the first cyclic molecule, or b) the second cyclic molecule of the second polyrotaxane and the first polyrotaxane may be physically or chemically bound through the first and second cyclic molecules, or c) the second polyrotaxane may have both bindings of the above items a) and b). It is preferable that the first and second polyrotaxanes may be chemically bound via the first and second cyclic molecules, in terms of providing further viscoelasticity caused by the movement of the cyclic molecules.

In a case where the material according to the present invention has the second polyrotaxane, the second polyrotaxane may be the same as or different from the first polyrotaxane. Furthermore, the second linear molecule, the second cyclic molecule, the second capping group and the like of the second polyrotaxane may have a composition similar to the one described above.

In the material according to the present invention, the cyclic molecule may be a cyclodextrin molecule which may be substituted, and the linear molecule may be polyethylene glycol.

In the material according to the present invention, the linear molecule may have the cyclic molecules included in a skewered manner at an amount of 0.001 to 0.6, preferably 0.01 to 0.5, and more preferably 0.05 to 0.4 of a maximum inclusion amount, which is defined as an amount at which the cyclic molecules can be included at maximum when the linear molecule has the cyclic molecules included in a skewered manner, and the amount at maximum is normalized to be 1.

When the inclusion amount of a cyclic molecule is near the maximum value, there occurs a tendency that the moving distance of a cyclic molecule along a linear molecule is limited. When the moving distance is limited, a tendency of limitation of the degree of expansion and contraction of the material occurs undesirably.

The maximum inclusion amount of a cyclic molecule can be determined depending on the length of a linear molecule and the thickness of a cyclic molecule. For example, when the linear molecule is polyethylene glycol and the cyclic molecule is an α-cyclodextrin molecule, the maximum inclusion amount is measured empirically (see, Macromolecules 1993, 26, 5698-5703, whole contents of which is incorporated herein by reference).

The material of the present invention can provide stretchability owing to the presence of the first polyrotaxane. As described above, stretchability depends on the amount of the first polyrotaxane, the inclusion amount described above, and the like, and it is preferable to control these amounts depending on a property required for the material.

The material according to the present invention can be applied to a polymer material required to have stretchability. Examples of the polymer material may include, but are not limited to, optical materials, contact lenses, biomaterials, medical materials, tire materials, application agents, adhesives and the like; and environment-related materials, living wares, civil engineering and construction materials, battery-related materials, foods, health materials, sports equipment and materials thereof, cloth and fashion materials, fibers, toy and entertainment materials, art-related materials, automobile-related materials, and the like.

Examples of the material may include, but are not limited to, the following materials.

That is, examples of the application range of the material according to the present invention may include rubber band, packing material, agar medium, clothing fabric, shoe sole of sport shoes and the like, cushioning material or impulse absorbing material of helmet, protector and the like, bumper of automobile and various apparatuses, toy, coating material for friction part of apparatus (for example, coating material for sliding part or housing of pump), adhesive, sealing material for tight seal, dehumidification agent or dew removing material, filler for bed mat analogous to water bed, material for special effect photograph or material for miniature model, optical material such as material for soft contact lens (particularly, material for soft contact lens having high moisture content and/or excellent strength), material for tire, gel for electrophoresis, novel foodstuff pursuant to gum and the like, gum for dog, biomaterials including biocompatible materials such as artificial cornea, artificial crystalline lens, artificial vitreous body, artificial skin, artificial muscle, artificial joint, artificial cartilage and the like and material for breast enlargement and the like, medical materials used for outside of the body such as wet dressing material, wound covering material and the like, drug delivery system, earplug, wet suit, protective mat mounted on wall in outfield in baseball ground, armrest for personal computer, disposable sanitary products such as child diaper, sanitary napkin, adult incontinence products and the like, photosensitive material for photograph, aromatic substance, application agents such as coating materials including various paints and the coating material, separation functional membrane, water-swelling rubber, waterproof tape, soil, material for pile drawing out material, material for removing moisture in oil, humidity conditioning material, moisture absorbing gelling agent, dehumidifier, artificial snow material in indoor artificial ski area, fire-proof coating material for building, sand and rock avalanche preventing material, concrete products such as concrete laying material and the like, waste mud gelling agent, lost circulation preventing agent, greening materials such as soil water-retentive agent or seedling raising medium and the like, material for chromatography carrier, material for bioreactor carrier, various element materials of fuel battery, for example, various battery materials such as electrolyte and the like.

The materials can be produced, for example, by methods described below:

A method of producing the material according to the present invention comprises the steps of:

a) preparing the first polyrotaxane which comprises a first cyclic molecule(s), a first linear molecule which is included in a cavity (cavities) of the first cyclic molecule(s) in a skewered manner, and a first capping group which is located at each end of the first linear molecule to prevent the dissociation of the first cyclic molecule(s), and the first cyclic molecule(s) has (have) a first photo-reactive group;

b) preparing the polymer comprising a second photo-reactive group which may be the same as or different from the first photo-reactive group;

c) mixing the first polyrotaxane and the polymer to obtain the mixture; and d) irradiating the mixture and binding at least a part of the first polyrotaxane and the polymer to each other by a photo-crosslinking reaction through the first cyclic molecule(s), to obtain the material.

In the step c), other polymers can be present in addition to the polymer having the second photo-reactive group. For example, the other polymers may include the same kind of polymers as polymers having the second photo-reactive group that are different only in not having the second photo-reactive group.

The first and second photo-reactive groups may also be all groups each having an unsaturated bond, all photosensitive groups, partially group(s) each having an unsaturated bond, or partially photosensitive groups. Additionally, the groups each having the unsaturated bond may be all the same kind of groups or may contain two or more kinds of unsaturated bonds. The photosensitive group may be all the same kind of groups or may contain two or more kinds of photosensitive groups. Moreover, the groups as mentioned above can be used as groups each having the unsaturated bond and photosensitive groups.

In the photo-crosslinking reaction, a reaction initiator may be used. In this case, during the step c) or subsequent to the step c) and prior to the step d), the method according to the present invention may further comprise a step of adding a reaction initiator to the mixture. This makes it possible to, for example, carry out photo-crosslinking reaction between the groups each having the unsaturated bond, which is initiated by a reaction initiator by irradiation of light in the step d) to bind the first polyrotaxane to the polymer. Furthermore, the reaction initiators used herein may include initiators similar to those mentioned above.

In a case where a part of the first and second photo-reactive groups are groups each having an unsaturated bond and a part of the first and second photo-reactive groups are photosensitive groups, the timing of the photo-crosslinking reaction in the step d) can be shifted as in the following. That is, i) after groups each having an unsaturated bond are reacted with each other, photosensitive groups are reacted with each other to give bonded substances. In addition, ii) after photosensitive groups are reacted with each other, groups each having an unsaturated bond are reacted with each other to give bonded substances. Moreover, iii) groups each having an unsaturated bond and photosensitive groups are reacted with each other almost simultaneously to give bonded substances. The reactions of the items i) to iii) can be employed, depending on reaction conditions of groups each having an unsaturated bond and photosensitive groups, solvents (conditions if not used) to be used, characteristics of materials to be obtained and the like.

Although a polymer used in the present invention depends on applications of the material, the method according to the present invention may further comprise a step of crosslinking the polymers with each other, prior to the step b) or subsequent to the step b).

The present invention will be illustrated more specifically by way of the following Examples, but is not limited thereby.

Example 1

Polyrotaxane was prepared in a manner same as described in Japanese Patent No. 3475252. That is, polyrotaxane A-1 was prepared by using PEG (Molecular Weight: 35,000), α-cyclodextrin, degree of inclusion: 22%, and capping group: adamantane group.

<<Incorporation of a Methacryloyl Group into α-CD>>

1.4 g of the polyrotaxane A-1 as prepared above was dissolved in 20 ml of dehydrated DMSO and 0.12 g of dimethylaminopyridine was added thereto, and then 1.4 g of glycidyl methacrylate was added dropwise. After stirring for 24 hours, the reaction solution was diluted to 50 ml with purified water. The diluted solution was dialyzed with a dialysis tube (fraction molecular weight: 12,000) for 48 hours in flowing tap water. The resulting solution was further dialyzed for 12 hours four times in 2000 ml of purified water and then freeze-dried to give a methacryloylated polyrotaxane B-1 in which a part of OH groups of α-CD is substituted with a 3-methacryloyloxy-2-hydroxypropyl group (incorporation ratio: 7% relative to the amount of OH group). Yield: 1.1 g.

$^1$H-NMR (DMSO-d$_6$, 400 MHz) δ (ppm) 1.9 (s, 3.0H), 3.0-4.0 (m, 59.4H), 4.4 (s, 5.2H), 4.8 (s, 4.7H), 5.2-6.2 (m, 11.1H).

<Photo-Crosslinking of Polyrotaxane Having Incorporated Thereinto a Methacryloyl Group)

50 mg of the polyrotaxane B-1 having incorporated thereinto the methacryloyl group was dissolved in 0.5 ml of DMSO, and 0.005 ml of a 1:1 eutectic mixture of 1-hydroxycyclohexylphenylketone and benzophenone was added thereto and stirred. The solution was irradiated with light using an ultra-high pressure mercury lamp (350 W) to observe gelation in about 30 seconds. The resulting gel was colorless and transparent. The gel was immersed in pure water for solvent exchange to give an opaque hydrogel.

Example 2

Polyrotaxane A-2 was prepared in a manner similar to Example 1, except degree of inclusion: 29%.

<<Oxymethylation of α-CD>>

10 g of the polyrotaxane A-2 as prepared above was dissolved in 200 ml of dehydrated DMSO. To the mixture was added 6.6 g of a 25% solution of sodium methoxide in methanol (corresponding to 3.6 equivalents relative to 18 equivalents of hydroxyl groups of an α-CD molecule in the polyrotaxane A-2), followed by removing methanol in reduced vacuum. To the mixture was added 4.4 g of methyl iodide, stirred for 24 hours, and then diluted with purified water to 400 ml of volume. The diluted mixture was dialyzed for 48 hours with a dialysis tube (fraction molecular weight: 12,000) in flowing tap water. The mixture was further dialyzed for 12 hours in 1000 ml of purified water four times, and then freeze-dried to give a methylated polyrotaxane B-2 in which a part of OH groups of an α-CD molecule is substituted with an OCH$_3$ group (degree of methylation: 20% against OH group). Yield: 8.7 g.

$^1$H-NMR (DMSO-d$_6$, 300 MHz) δ (ppm) 3.0-4.2 (m, 7.8H), 4.3-5.2 (m, 1.6H), 5.3-6.0 (m, 1H).

<<Incorporation of a Methacryloyl Group into α-CD>>

1.0 g of the oxymethylated polyrotaxane B-2 as prepared above was dissolved in 10 ml of dehydrated DMSO, and 0.1 g of dimethylaminopyridine was added thereto, and then 1.0 g of glycidyl methacrylate was added dropwise. After stirring for 24 hours, the reaction solution was diluted to 30 ml with purified water. The diluted solution was dialyzed with a dialysis tube (fraction molecular weight: 12,000) for 48 hours in flowing tap water. The resulting solution was further dialyzed for 12 hours four times in 2000 ml of purified water and then freeze-dried to give a methacryloylated polyrotaxane B-3 in which a part of OH groups of α-CD is substituted with a 3-methacryloyloxy-2-hydroxypropyl group (incorporation ratio: 11% relative to the amount of OH group). Yield: 1.0 g.

$^1$H-NMR (DMSO-d$_6$, 400 MHz) δ (ppm) 1.9 (s, 3.0H), 3.0-4.3 (m, 36.7H), 4.3-5.2 (m, 7.7H), 5.4-6.2 (m, 4.2H).

<Photo-Crosslinking of Polyrotaxane Having Incorporated Thereinto a Methacryloyl Group>

50 mg of the polyrotaxane B-3 having incorporated thereinto the methacryloyl group was dissolved in 0.5 ml of pure water while it was cooled in ice water and stirred. This solution was opaque at room temperature. Thereto was added 0.005 g of 2-hydroxy-1-[4-(2-hydroxyethoxy)phenyl]-2-methyl-1-propanone and stirred. The resulting solution was irradiated with light using an ultra-high pressure mercury lamp (350 W) to observe gelation in about 30 seconds.

Example 3

Polyrotaxane A-2 was prepared in a manner same as Example 2.

<<Hydroxypropylation of α-CD>>

5.0 g of the polyrotaxane A-2 as prepared above was dissolved in 50 ml of a 1N NaOH aqueous solution, and to the resulting mixture was added 10 g of propylene oxide. The mixture was stirred for 24 hours at room temperature, and then neutralized with hydrochloric acid. The resulting solution was dialyzed for 48 hours with a dialysis tube (fraction molecular weight: 12,000) in flowing tap water. The mixture was further dialyzed for 12 hours in 2000 ml of purified water four times, and then freeze-dried to give 5.0 g of the resulting product (a hydroxypropylated polyrotaxane B-4)(degree of hydroxypropylation: 33% to the OH groups).

$^1$H-NMR (DMSO-$d_6$, 400 MHz) δ (ppm) 1.0 (s, 3.0H), 3.1-4.0 (m, 14.0H), 4.3-5.1 (m, 3.1H), 5.3-6.0 (m, 1.0H).

<<Incorporation of a Methacryloyl Group into Hyroxypropylated Polyrotaxane>>

0.5 g of the hyroxypropylated polyrotaxane B-4 as prepared above was dissolved in 5 ml of 0.1N NaOH, and 0.5 g of glycidyl methacrylate was added dropwise thereto. After stirring for 72 hours, the reaction solution was neutralized with 1N-HCl aqueous solution. Then, the solution was dialyzed with a dialysis tube (fraction molecular weight: 12,000) for 12 hours in flowing tap water. The resulting solution was further dialyzed for 12 hours two times in 2000 ml of purified water and then freeze-dried to give a methacryloylated polyrotaxane B-5 in which a part of OH groups is substituted with a 3-methacryloyloxy-2-hydroxypropyl group (incorporation ratio: 0.4% relative to the amount of hydroxyl group). Yield: 0.5 g.

$^1$H-NMR (DMSO-$d_6$, 400 MHz) δ (ppm) 1.0 (s, 3.0H), 1.9 (s, 0.04H), 3.0-4.1 (m, 13.7H), 4.3-5.2 (m, 3.0H), 5.3-6.2 (m, 0.9H).

<Photo-Crosslinking of Polyrotaxane Having Incorporated Thereinto a Methacryloyl Group>

70 mg of the polyrotaxane B-5 having incorporated thereinto the methacryloyl group was dissolved in 0.2 ml of pure water while it was cooled in ice water and stirred. The solution was opaque at room temperature. Thereto was added 0.0014 g of 2-hydroxy-1-[4-(2-hydroxyethoxy)phenyl]-2-methyl-1-propanone and stirred. The resulting solution was irradiated with light using an ultra-high pressure mercury lamp (350 W) to observe gelation in about 120 seconds. The resulting gel was immersed in pure water and then swelled.

Example 4

Polyrotaxane A-2 was prepared in a manner same as Example 2.

<<Hydroxypropylation of α-CD>>

50 g of the polyrotaxane A-2 as prepared above was dissolved in 250 ml of a 1N NaOH aqueous solution, and to the resulting mixture was added 100 g of propylene oxide. The mixture was stirred for 24 hours at room temperature, and then neutralized with hydrochloric acid. The resulting solution was dialyzed for 48 hours with a dialysis tube (fraction molecular weight: 12,000) in flowing tap water. The mixture was further dialyzed for 12 hours in 5000 ml of purified water four times, and then freeze-dried to give 59 g of the resulting product (a hydroxypropylated polyrotaxane B-6)(degree of hydroxypropylation: 52% to the OH groups).

$^1$H-NMR (DMSO-$d_6$, 400 MHz) δ (ppm) 1.0 (s, 3.0H), 3.1-4.0 (m, 10.3H), 4.3-5.1 (m, 2.3H), 5.3-6.0 (m, 0.28H).

<<Incorporation of a Methacryloyl Group into Hyroxypropylated Polyrotaxane>>

10 g of the hyroxypropylated polyrotaxane B-6 as prepared above was dissolved in 100 ml of dehydrated DMSO, and 0.2 g of 2-methacryloyloxyethyl isocyanate was added dropwise thereto. After stirring for 24 hours, the reaction solution was diluted with purified water to 200 ml. Then, the diluted solution was dialyzed with a dialysis tube (fraction molecular weight: 12,000) for 48 hours in flowing tap water. The resulting solution was further dialyzed for 12 hours four times in 2000 ml of purified water and then freeze-dried to give a methacryloylated polyrotaxane B-7 in which a part of OH groups of α-CD is substituted with a 2-methacryloyloxyethylcarbamoyl group (incorporation ratio: 1.8% relative to the amount of hydroxyl group). Yield: 9.6 g.

$^1$H-NMR (DMSO-$d_6$, 400 MHz) δ (ppm) 1.0 (s, 3.0H), 1.9 (s, 0.1H), 3.0-4.1 (m, 9.7H), 4.3-5.2 (m, 2.5H), 5.3-6.2 (m, 0.5H).

<Photo-Crosslinking of Polyrotaxane Having Incorporated Thereinto a Methacryloyl Group>

300 mg of the polyrotaxane B-7 having incorporated thereinto the methacryloyl group was dissolved in 0.7 ml of pure water. Thereto was added 0.002 g of 2-hydroxy-1-[4-(2-hydroxyethoxy)phenyl]-2-methyl-1-propanone and stirred. The resulting solution was irradiated with light for about 10 seconds using an ultra-high pressure mercury lamp (350 W) to give a colorless, transparent gel. Mechanical properties of the resulting gel were determined. An elongation ratio was 110%, a maximum stress was 110 kPa, and a stiffness was 97 kPa.

Example 5

Polyrotaxane A-3 was prepared in a manner similar to Example 2, except that molecular weight of PEG was 500,000, and degree of inclusion was 29%.

<<Hydroxypropylation of α-CD>>

30 g of the polyrotaxane A-3 as prepared above was dissolved in 500 ml of a 1N NaOH aqueous solution, and to the resulting mixture was added 100 g of propylene oxide. The mixture was stirred for 24 hours at room temperature, and then neutralized with hydrochloric acid. The resulting solution was dialyzed for 48 hours with a dialysis tube (fraction molecular weight: 12,000) in flowing tap water. The mixture was further dialyzed for 12 hours in 5000 ml of purified water four times, and then freeze-dried to give 29 g of the resulting product (a hydroxypropylated polyrotaxane B-8)(degree of hydroxypropylation: 32% to the OH groups).

$^1$H-NMR (DMSO-$d_6$, 400 MHz) δ (ppm) 1.0 (s, 3.0H), 3.1-4.0 (m, 15.4H), 4.3-5.1 (m, 3.2H), 5.3-6.0 (m, 1.0H).

<<Incorporation of a Methacryloyl Group into Hyroxypropylated Polyrotaxane>>

10 g of the hyroxypropylated polyrotaxane B-8 as prepared above was dissolved in 150 ml of dehydrated DMSO, and 0.26 g of 2-methacryloyloxyethyl isocyanate was added dropwise thereto. After stirring for 24 hours, the reaction solution was diluted with purified water to 500 ml. Then, the diluted solution was dialyzed with a dialysis tube (fraction molecular weight: 12,000) for 48 hours in flowing tap water. The resulting solution was further dialyzed for 12 hours four times in 2000 ml of purified water and then freeze-dried to give a methacryloylated polyrotaxane B-9 in which a part of OH groups of α-CD is substituted with a 2-methacryloyloxyethylcarbamoyl group (incorporation ratio: 1.8% relative to the amount of hydroxyl group). Yield: 9.6 g.

$^1$H-NMR (DMSO-$d_6$, 400 MHz) δ (ppm) 1.0 (s, 3.0H), 1.9 (s, 0.1H), 3.0-4.1 (m, 9.7H), 4.3-5.2 (m, 2.5H), 5.3-6.2 (m, 0.5H).

<Photo-Crosslinking of Polyrotaxane Having Incorporated Thereinto a Methacryloyl Group<

100 mg of the polyrotaxane B-9 having incorporated thereinto the methacryloyl group was dissolved in 0.9 ml of pure water. Thereto was added 0.002 g of 2-hydroxy-1-[4-(2-hydroxyethoxy)phenyl]-2-methyl-1-propanone and stirred. The resulting solution was irradiated with light for about 10 seconds using an ultra-high pressure mercury lamp (350 W) to give a colorless, transparent gel. Mechanical properties of the resulting gel were determined. An elongation ratio was 270%, a maximum stress was 90 kPa, and a stiffness was 32 kPa.

Example 6

Hyroxypropylated polyrotaxane B-6 was prepared in a manner similar to the method described in Example 4.

<<Incorporation of an Acryloyl Group into Hyroxypropylated Polyrotaxane>>

10 g of the hyroxypropylated polyrotaxane B-6 as prepared above was dissolved in 100 ml of dehydrated DMSO, and 0.5 g of 2-acryloyloxyethyl isocyanate was added dropwise thereto. After stirring for 24 hours, the reaction solution was diluted with purified water to 500 ml. Then, the diluted solution was dialyzed with a dialysis tube (fraction molecular weight: 12,000) for 48 hours in flowing tap water. The resulting solution was further dialyzed for 12 hours four times in 2000 ml of purified water and then freeze-dried to give a acryloylated polyrotaxane B-10 in which a part of OH groups of α-CD is substituted with a 2-acryloyloxyethylcarbamoyl group (incorporation ratio: 2.2% relative to the amount of hydroxyl group). Yield: 7.6 g.

$^1$H-NMR (DMSO-$d_6$, 400 MHz) δ (ppm) 1.0 (s, 3.0H), 3.0-4.1 (m, 12.2H), 4.3-5.2 (m, 2.4H), 5.3-6.2 (m, 0.3H).

<Photo-Crosslinking of Polyrotaxane Having Incorporated Thereinto an Acryloyl Group>

400 mg of the polyrotaxane B-10 having incorporated thereinto the acryloyl group was dissolved in 0.6 ml of pure water. Thereto was added 0.002 g of 2-hydroxy-1-[4-(2-hydroxyethoxy)phenyl]-2-methyl-1-propanone and stirred. The resulting solution was irradiated with light for about 10 seconds using an ultra-high pressure mercury lamp (350 W) to give a colorless, transparent gel. Mechanical properties of the resulting gel were determined. An elongation ratio was 100%, a maximum stress was 200 kPa, and a stiffness was 180 kPa.

Example 7

Hyroxypropylated polyrotaxane B-6 was prepared in a manner similar to the method described in Example 4.

<<Incorporation of an Acryloyl Group into Hyroxypropylated Polyrotaxane>>

5 g of the hyroxypropylated polyrotaxane B-6 as prepared above was dissolved in 50 ml of a dehydrated N,N-dimethylacetamide/lithium chloride (8%) solution, 1 ml of triethylamine was added thereto, and then 0.7 g of acryloyl chloride was added dropwise in an ice-cold condition. After stirring for six hours, the reaction solution was diluted with purified water to 200 ml. Then, the diluted solution was dialyzed with a dialysis tube (fraction molecular weight: 12,000) for 48 hours in flowing tap water. The resulting solution was further dialyzed for 12 hours four times in 2000 ml of purified water and then freeze-dried to give a acryloylated polyrotaxane B-11 in which a part of OH groups of α-CD is substituted with an acryloyl group (incorporation ratio: 1% relative to the amount of hydroxyl group). Yield: 3.6 g.

$^1$H-NMR (DMSO-$d_6$, 400 MHz) δ (ppm) 1.0 (s, 3.0H), 3.0-4.1 (m, 9.3H), 4.3-5.2 (m, 2.3H), 5.3-6.2 (m, 0.3H).

<Photo-Crosslinking of Polyrotaxane Having Incorporated Thereinto an Acryloyl Group>

400 mg of the polyrotaxane B-11 having incorporated thereinto the acryloyl group was dissolved in 0.6 ml of pure water. Thereto was added 0.002 g of 2-hydroxy-1-[4-(2-hydroxyethoxy)phenyl]-2-methyl-1-propanone and stirred. The resulting solution was irradiated with light for about 10 seconds using an ultra-high pressure mercury lamp (350 W) to give a colorless, transparent gel. Mechanical properties of the resulting gel were determined. An elongation ratio was 90%, a maximum stress was 180 kPa, and a stiffness was 300 kPa.

Example 8

Polyrotaxane A-2 was prepared in a manner similar to the method described in Example 2.

<<Incorporation of a Methoxycinnamoyl Group into α-CD>>

1.1 g of the 4-methoxycinnamic acid was dissolved in 3 ml of dehydrated DMSO. Thereto was added 1.2 g of carbonyldiimidazole. After stirring for one hour, this solution was added to a solution of 0.3 g of polyrotaxane A-2 as prepared above in 3 ml of dehydrated DMSO, and stirred at 50° C. for three days. The reaction solution was added dropwise to 100 ml of acetone. The precipitated pale yellow solid was filtrated and dried in vacuo. The yield of the resulting product (methoxycinnamoylated polyrotaxane B-12) was 0.39 g (incorporation ratio: 32% relative to the amount of hydroxyl group). In addition, the presence of methoxycinnamic acid was confirmed from an ultraviolet-visible absorption spectrum (λmax=310 nm) of the DMSO solution of the product.

$^1$H-NMR (DMSO-$d_6$, 400 MHz) δ (ppm) 3.0-6.0 (m, 13.7H), 6.0-8.2 (m, 6.0H).

<Photo-Crosslinking of Polyrotaxane Having Incorporated Thereinto a Methoxycinnamoyl Group>

100 mg of the polyrotaxane B-12 having incorporated thereinto the methoxycinnamoyl group was dissolved in 0.1 ml of DMSO. The solution was irradiated with light using an ultra-high pressure mercury lamp (350 W) for 30 minutes and then immersed in DMSO to give a gel solid.

Figure 1:
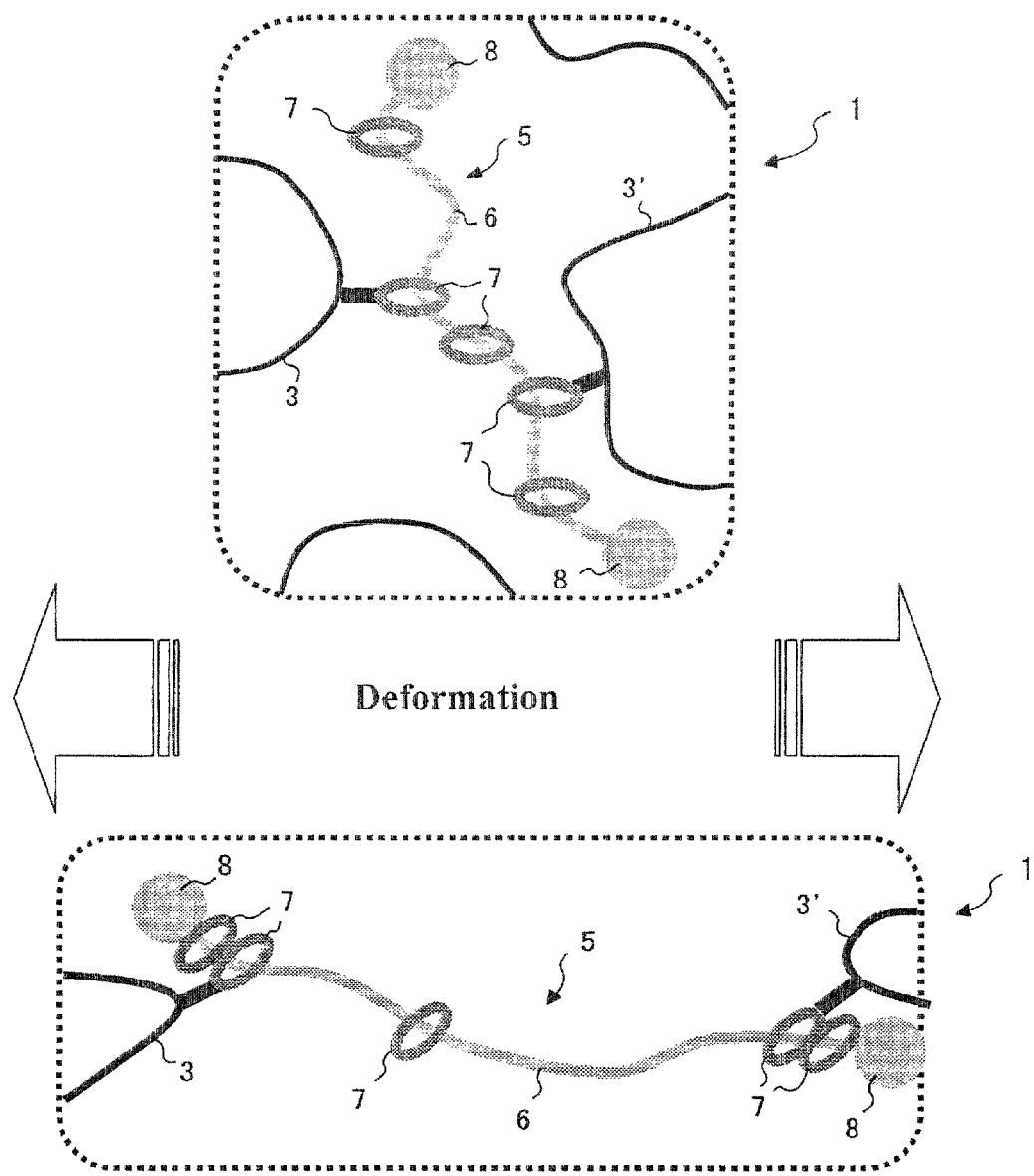
FIG. 1 shows a scheme of a material according to the present invention.

The embodiments of the invention in which an exclusive property or privilege is claimed are defined as follows:

1. A material comprising a first polyrotaxane and a second polyrotaxane,
   wherein the first polyrotaxane comprises a first cyclic molecule(s), a first linear molecule which is included in a cavity or cavities of the first cyclic molecule(s) in a skewered manner, and a first capping group which is located at each end of the first linear molecule to prevent the dissociation of the first cyclic molecule(s),
   wherein the second polyrotaxane comprises a second cyclic molecule(s), a second linear molecule which is included in a cavity or cavities of the second cyclic molecule(s) in a skewered manner, and a second capping group which is located at each end of the second linear molecule to prevent the dissociation of the second cyclic molecule(s),
   wherein a part of the first polyrotaxane and the second polyrotaxane is bound to each other through the first cyclic molecule(s) or through the first or second cyclic molecule(s),
   wherein the first cyclic molecule(s) and the second cyclic molecule(s) each has a photo-reactive group that is not a photosensitive group, wherein each of the photo-reactive groups in the first and second cyclic molecules is a group having an unsaturated bond, and
   wherein the first and second polyrotaxanes are bound to each other by a photo-crosslinking reaction between the photo-reactive groups, wherein a reaction initiator is used in the photo-crosslinking reaction.

2. The material according to claim 1, wherein the reaction initiator is at least one selected from the group consisting of quinones, aromatic ketones, benzoin, benzoin ethers, biimidazole compounds or derivatives thereof, N-phenylglycines, combinations of thioxanthones and alkylaminobenzoic acid, and combinations of biimidazole compounds or derivatives thereof and Michler's ketones, acridines, or oxime esters.

3. The material according to claim 1, wherein each of the first and second linear molecules is selected from the group consisting of polyethylene glycol, polyisoprene, polyisobutylene, polybutadiene, polypropylene glycol, polytetrahydrofuran, polydimethylsiloxane, polyethylene and polypropylene.

4. The material according to claim 1, wherein the first and second linear molecule each has a molecular weight of 10,000 or more.

5. The material according to claim 1, wherein each of the first and second capping groups is selected from the group consisting of dinitrophenyl groups, cyclodextrins, adamantane groups, trityl groups, fluoresceins, pyrenes, substituted benzenes, polycyclic aromatics which may be substituted, and steroids.

6. The material according to claim 1, wherein each of the first and second cyclic molecules is a cyclodextrin molecule which may be substituted.

7. The material according to claim 1, wherein each of the first and second cyclic molecules is a cyclodextrin molecule which may be substituted, and the cyclodextrin molecule is selected from the group consisting of α-cyclodextrin, β-cyclodextrin and γ-cyclodextrin, and derivatives thereof.

8. The material according to claim 1, wherein each of the first and second cyclic molecules is α-cyclodextrin which may be substituted, and each of the first and second linear molecules is polyethylene glycol.

9. The material according to claim 1, wherein each of the first and second linear molecules has the first and second cyclic molecule included in a skewered manner at an amount of 0.001 to 0.6 of a maximum inclusion amount, which is defined as an amount at which the first and second cyclic molecules can be included at maximum when each of the first and second linear molecules has the first and second cyclic molecules included in a skewered manner, and the amount at maximum is normalized to be 1.

10. A method for preparing a material which comprises a first polyrotaxane and a polymer second polyrotaxane, comprising the steps of:
   a) preparing the first polyrotaxane which comprises a first cyclic molecule(s), a first linear molecule which is included in a cavity or cavities of the first cyclic molecule(s) in a skewered manner, and a first capping group which is located at each end of the first linear molecule to prevent the dissociation of the first cyclic molecule(s), and the first cyclic molecule(s) has (have) a first photo-reactive group;
   b) preparing the second polyrotaxane, which comprises a second cyclic molecule(s), a second linear molecule which is included in a cavity or cavities of the second cyclic molecule(s) in a skewered manner, and a second capping group which is located at each end of the second linear molecule to prevent the dissociation of the second cyclic molecule(s), wherein the second cyclic molecule(s) has (have) a second photo-reactive group which may be the same as or different from the first photo-reactive group, wherein each of the first and second photo-reactive groups is not a photosensitive group, and wherein each of the first and second photo-reactive groups is a group having an unsaturated bond;
   c) mixing the first polyrotaxane and the second polyrotaxane to obtain the mixture; and
   d) irradiating the mixture and binding at least a part of the first polyrotaxane and the second polyrotaxane to each other by a photo-crosslinking reaction through the first and second cyclic molecules, to obtain the material.

11. The method according to claim 10, wherein during the step c), or after the step c) and prior to the step d), the method further comprises a step of adding a reaction initiator into the mixture.

* * * * *

UNITED STATES PATENT AND TRADEMARK OFFICE
CERTIFICATE OF CORRECTION

| PATENT NO. | : 7,981,943 B2 |
|---|---|
| APPLICATION NO. | : 11/816613 |
| DATED | : July 19, 2011 |
| INVENTOR(S) | : K. Ito et al. |

Page 1 of 1

It is certified that error appears in the above-identified patent and that said Letters Patent is hereby corrected as shown below:

| COLUMN | LINE | ERROR |
|---|---|---|
| (57) Pg. 1, col. 2 | Abstract 4 of text | "a first cyclic molecules" should read --a first cyclic molecule-- |
| 22 (Claim 10, | 6 line 2) | before "second polyrotaxane," delete "polymer" |
| 22 (Claim 10, | 22-23 lines 18-19) | "molecule (s)" should not be separated by a line break, but should read --molecule(s)-- |

Signed and Sealed this
Twenty-ninth Day of November, 2011

David J. Kappos
*Director of the United States Patent and Trademark Office*